United States Patent [19]
Go et al.

[11] Patent Number: 5,510,932
[45] Date of Patent: Apr. 23, 1996

[54] OPTICAL DEMULTIPLEXING MODULE, OPTICAL MULTIPLEXING MODULE AND HOUSINGS THEREFOR

[75] Inventors: Hisao Go; Norimasa Kushida, both of Kanagawa, Japan

[73] Assignee: Sumitomo Electric Industries, Ltd., Osaka, Japan

[21] Appl. No.: 333,344

[22] Filed: Nov. 2, 1994

[30] Foreign Application Priority Data

Nov. 2, 1993 [JP] Japan ................................. 5-274485
Jun. 22, 1994 [JP] Japan ................................. 6-139984

[51] Int. Cl.$^6$ .................................................. G02B 27/14
[52] U.S. Cl. ........................................... 359/341; 359/629
[58] Field of Search ............................ 359/341, 629, 359/634; 385/47

[56] References Cited

U.S. PATENT DOCUMENTS

| | | | |
|---|---|---|---|
| 4,701,010 | 10/1987 | Roberts | 350/96.15 |
| 5,140,466 | 8/1992 | Parker | 359/633 |
| 5,191,467 | 3/1993 | Kapany et al. | 359/341 |
| 5,299,056 | 3/1994 | Kurata et al. | 359/341 |

FOREIGN PATENT DOCUMENTS

| | | |
|---|---|---|
| 5341232 | 12/1993 | Japan . |
| 5343785 | 12/1993 | Japan . |
| 5341233 | 12/1993 | Japan . |

OTHER PUBLICATIONS

Naganuma et al, "Optical Module with Flat Wavelength Characteristics for Er–Doped Fiber Amplifiers", Optical Amplifiers and Their Applications, Jul., 1993, 1993 Technical Digest Series, vol. 14, pp. 234–237.

Kakinuma et al, "Er–Doped Fiber Amplifier", pp. 85–90.

*Primary Examiner*—Mark Hellner
*Attorney, Agent, or Firm*—Cushman Darby & Cushman

[57] ABSTRACT

The optical demultiplexing module of the present invention includes a square or rectangular housing body, a first collimator and a second collimator being provided normal to opposing sides of the housing body, respectively, a third collimator being provided normal to a side of the housing body at right angles to the opposing sides, a multiplexer, an optical isolator and a beam splitter being provided at the output end of the optical isolator, the multiplexer, the optical isolator and the beam splitter being provided in linear alignment, and a reflector mirror being provided on the optical axis of the pumping light to be admitted into the housing body from the third collimator. The second collimator is provided on the optical axis of the light passing through the beam splitter. The multiplexer is provided on the optical axis of the light to be reflected from the reflector mirror. The first collimator is provided on the optical axis of the light to be reflected from the multiplexer. Pumping light is admitted into the multiplexer at an angle of no more than 22.5 degrees.

21 Claims, 5 Drawing Sheets

OPTICAL DEMULTIPLEXING MODULE, OPTICAL MULTIPLEXING MODULE AND HOUSINGS THEREFOR

BACKGROUND OF THE INVENTION

1. Field of the Invention

The present invention relates to an optical demultiplexing module, as well as an optical multiplexing module that are used with amplifiers in fiber optic communication. The invention also relates to housings for such optical demultiplexing and multiplexing modules.

2. Description of the Related Art

Optical amplifiers capable of direct amplification of optical signals are becoming the subject of active development efforts since they can be used as repeaters to compensate for the attenuation of optical signals caused by transmission loss and other factors of optical fibers. Of a particular interest are optical amplifiers that use rare-earth doped fibers as amplifying media because of their small polarization-dependence and low-noise characteristics.

Such optical amplifiers can be implemented by two methods. One method is to combine rare-earth doped fibers with fiber optic couplers and the second method is to combine the fibers with optical devices such as a multiplexer, a beam splitter and ah optical isolator. The present invention concerns the second method of implementation. A conventional system that adopts this method is shown in FIG. 9, where signal light is combined with pumping light by means of a multiplexer 53 and the combined light is admitted into a rare-earth doped fiber 10 (for details, see Unexamined Published Japanese Patent Application (kokai) Hei 4-128718). Another conventional system uses a prism to combine the signal light with the pumping light (for details, see C-262 in the Collected Papers Read at the Spring Conference of The Institute of Electronics, Information and Communication Engineers, 1992).

If the optical devices used in an optical amplifier are largely dependent on polarization and wavelength, the characteristics of the amplifier per se are adversely affected to a large extent. To avoid this problem, the optical devices such as a multiplexer and a wavelength selecting filter are adapted to admit light at a smaller incident angle or otherwise modified so that they have no dependence on polarization or wavelength.

In the system configuration shown in FIG. 9, an optical fiber 51 is mounted at an angle with respect to the multiplexer 53 and this is in order to avoid the dependence on polarization and wavelength by insuring that the angle of incidence θ on the multiplexer 53 is sufficiently small. However, it is a disadvantage for production purposes that various optical devices are fixed so as to be inclined with respect to the sides of the housing during assembly because the production consumes a great deal of time.

If a prism is used as a multiplexer, other devices can be fixed in a direction normal to the sides of the housing but then a special treatment must be conducted on the devices. This contributes to a high manufacturing cost.

The conventional approaches have had a common problem in that the individual optical devices have to be assembled one by one into a single housing.

SUMMARY OF THE INVENTION

It is an object of the present invention to provide an optical demultiplexing module and an optical multiplexing module that permit easy assembly and adjustment. Another object of the invention is to provide housings for such optical demultiplexing and multiplexing modules.

An optical demultiplexing module of the present invention for admitting pumping light into a rare-earth element doped fiber and for passing signal light that is amplified in the rare-earth element doped fiber, comprises: a square or rectangular housing body; a first collimator and a second collimator being provided normal to opposing sides of the housing body, respectively; a third collimator being provided normal to a side of the housing body at right angles to the opposing sides; a multiplexer being provided on the optical axis of signal light which is admitted into the housing body from the first collimator; an optical isolator being provided on the optical axis of the light passing through the multiplexer; a beam splitter being provided at the output end of the optical isolator, the multiplexer, the optical isolator and the beam splitter being provided in linear alignment; and a reflector mirror being provided on the optical axis of the pumping light to be admitted into the housing body from the third collimator; wherein the second collimator is provided on the optical axis of the light passing through the beam splitter, the multiplexer is provided on the optical axis of the light to be reflected from the reflector mirror, and the first collimator on the optical axis of the light to be reflected from the multiplexer, and the pumping light is admitted into the multiplexer at an angle of no more than 22.5 degrees.

Having the structural features described above, both the optical demultiplexing and multiplexing modules of the present invention are so adapted that pumping light is admitted into the multiplexer at incident angles of no more than 22.5 degrees and, hence, their dependency on polarization and wavelength can be held at consistently low levels.

Further, signal light is not reflected within the housing but instead travels straight to be launched into or pass through the amplifying fiber, hence experiencing small insertion loss.

In the housing of the present invention, each of the collimators is mounted normal to the associated side of the housing and, hence, optical devices can be assembled and adjusted in the housing by simple procedures.

The invention also provides another housing for an optical demultiplexing/multiplexing module having one frame and two blocks. Individual devices are assembled and adjusted in each separate block and the blocks thus accommodating the necessary devices are combined together within the frame to complete the dual module. Hence, small optical devices can be easily assembled and adjusted within a limited space.

BRIEF DESCRIPTION OF THE DRAWINGS

In the accompanying drawings;

FIG. 8 is a perspective view showing the optical demultiplexing/multiplexing module as they are assembled into the housing shown in FIG. 7a.

PREFERRED EMBODIMENTS OF THE INVENTION

The preferred embodiments of the present invention will be described referring to the accompanying drawings. in which like elements are identified by like numerals and any repetitive explanation is omitted.

Embodiment 1

Figure 1:
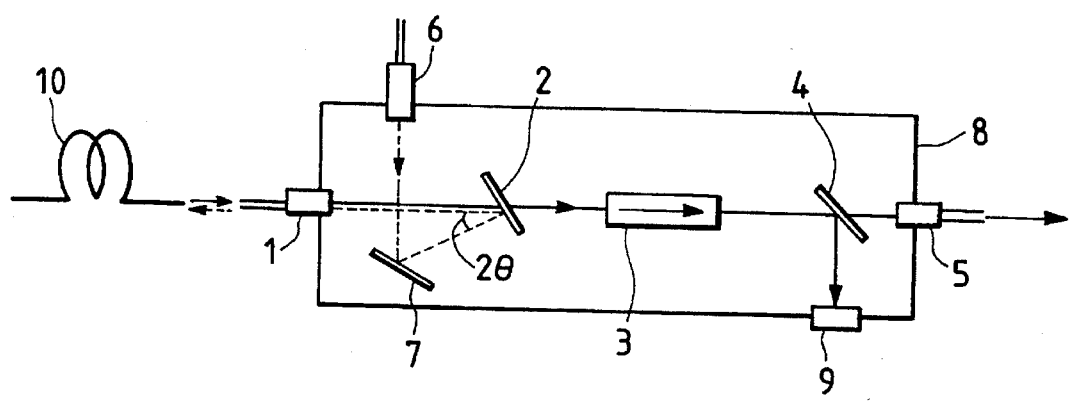
FIG. 1 is a schematic diagram showing the configuration of an embodiment of the optical demultiplexing module of the invention.

FIG. 1 is a schematic diagram showing the configuration of the optical demultiplexing module of the present invention. The module, which is to be placed ahead of an optical fiber 10 doped with a rare earth element such as Er, supplies pumping light into the fiber 10 and passes signal light that is amplified in that fiber.

A first collimator 1 and a second collimator 5 are provided normal to opposing sides of a square or rectangular housing 8, whereas a third collimator 6 is provided normal to a side of the housing at right angles to the opposing sides. Each collimator is formed by providing a lens either at the top end or ahead of the optical fiber and the light passing through the lens either remains parallel or converges at the focus. Housing 8 is made of a metal such as SUS or a hard plastic material that are either cut or extrusion molded to form an integral member that has a rugged and stable structure.

Signal light is admitted into the housing 8 from the first collimator 1 and a multiplexer 2 for transmitting the signal light and reflecting the pumping light is provided on the optical axis of housing 8. An optical isolator 3 for passing the light that travels in the direction indicated by a thick arrow but blocking the light in the opposite direction is provided on the optical axis, with the light passing through the multiplexer entering therein. A beam splitter 4 is provided at the output end of the optical isolator for reflecting part of the signal light but transmitting the remainder. The multiplexer 2, the optical isolator 3 and the beam splitter 4 are provided in mutual alignment. The second collimator 5 is provided on the optical axis of the light passing through the beam splitter 4.

A reflector mirror 7 is provided on the optical axis of the pumping light to be admitted into the housing 8 from the third collimator 6. The multiplexer 2 is provided on the optical axis of the light to be reflected from the reflector mirror. The first collimator 1 is provided on the optical axis of the light to be reflected from the multiplexer.

In accordance with the invention, the multiplexer 2 is so positioned that the angle θ at which the pumping light coming from the third collimator 6 is admitted into the multiplexer is no more than 22.5 degrees.

In addition to the above structure, a monitoring light-receiving device 9 is provided in the position where part of the signal light that is reflected from the beam splitter 4 crosses a side of the housing and this enables monitoring of the signal light level.

If the structural design shown in FIG. 1 is adopted, none of the collimators nor the monitoring device need to be provided at angles with respect to the housing (stated exactly, the monitoring device may in certain cases be inclined slightly in order to avoid return light due to reflection) and, further, the angle θ at which the pumping light is admitted into the multiplexer can be sufficiently reduced. As a consequence, the optical demultiplexing module can be fabricated easily while insuring that the optical devices used are less dependent on polarization and wavelength.

Figure 2:
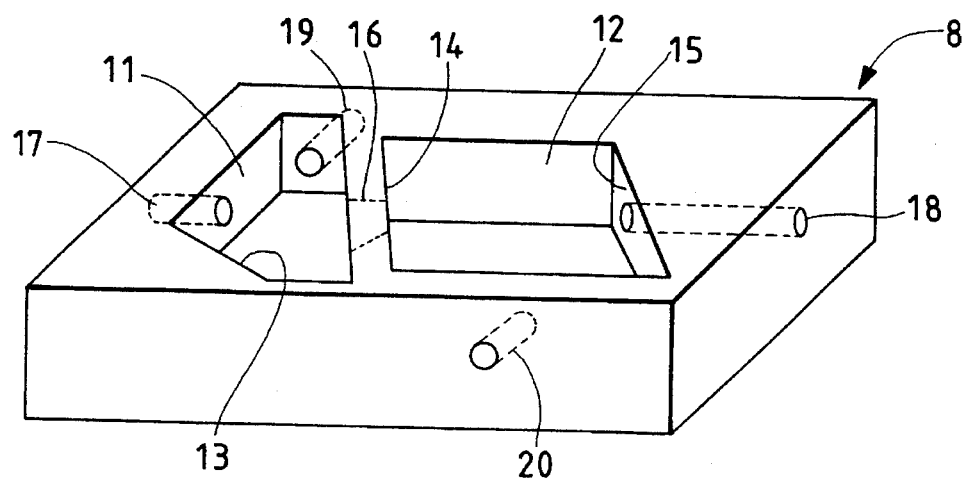
FIG. 2 is a perspective view of the housing for the optical demultiplexing module shown in FIG. 1.

FIG. 2 is a perspective view of the housing for the optical demultiplexing module shown in FIG. 1. The housing indicated by 8 is made of a single member in a square or rectangular form and a first hollow portion 11 and a second hollow portion 12 are formed from the top to the bottom surface in the central area of the housing. The first hollow portion 11 has a first inner surface 13 formed for fixing the reflector mirror 7 as it is inclined at a predetermined angle. The second hollow portion 12 has a second inner surface 14 and a third inner surface 15 provided for mounting the multiplexer 2 and the beam splitter 4, respectively, as they are inclined at predetermined angles, as well as a space into which the optical isolator 3 is to be inserted and fixed. A fourth hole 16 is provided between the first hollow portion 11 and the second hollow portion 12 for passing both the signal light and the pumping light.

A first hole 17 and a second hole 18 are provided in opposing sides of the housing for mounting the first collimator 1 and the second collimator 5, respectively, normal to the opposing sides, and a third hole 19 is provided in a side of the housing at right angles to the opposing sides for mounting the third collimator 6 normal to the side.

The first hole 17, the fourth hole 16 and the second hole 18 are provided in such a way that the signal light emitting from the first collimator 1 passes through the multiplexer 2, the optical isolator 3 and the beam splitter 4 to reach the second collimator 5 at a point in alignment with those three elements. The first inner surface 13 and the second inner surface 14 are adjusted in the angle θ so that the pumping light emitting from the third collimator 6 is admitted into the first collimator 1 by means of the reflector mirror 7 and the multiplexer 2 which are to be adhesively fixed on the first and second inner surfaces, respectively.

Figure 3:
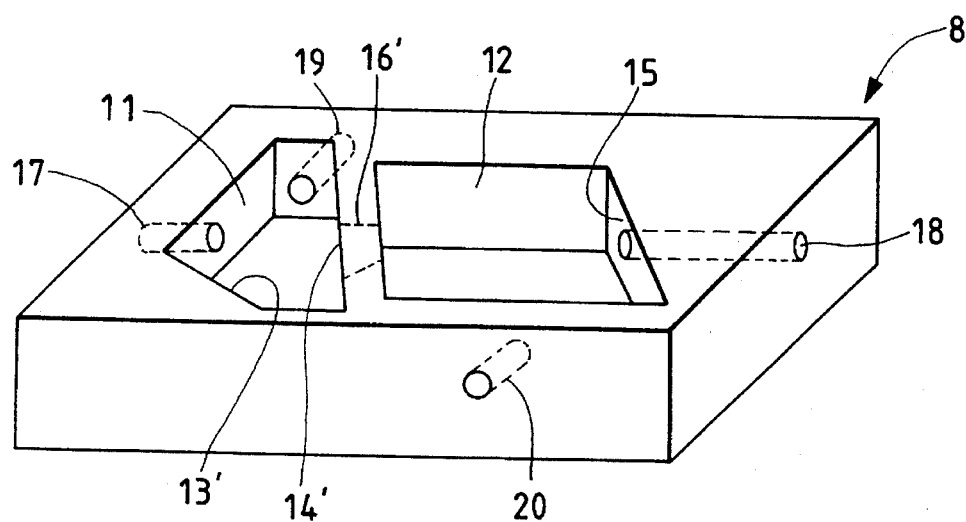
FIG. 3 is a perspective view showing another housing for the optical demultiplexing module shown in FIG. 1.

FIG. 3 is a perspective view showing another housing for the optical demultiplexing module shown in FIG. 1. The first hollow portion 11 has a first inner surface 13' and a second inner surface 14' formed for mounting the reflector mirror 7 and the multiplexer 2, respectively, as they are inclined at predetermined angles. The second hollow portion 12 has a third inner surface 15 provided for mounting the beam splitter 4 as it is inclined at a predetermined angle, as well as a space into which the optical isolator 3 is to be inserted and fixed. A fourth hole 16' is provided between the first hollow portion 11 and the second hollow portion 12 for passing the signal light.

The first inner surface 13' and the second inner surface 14' are adjusted in the angle θ so that the pumping light emitting from the third collimator is admitted into the first collimator by means of the reflector mirror 7 and the multiplexer 2 which are to be adhesively fixed on the first and second inner surfaces, respectively.

In the, housings shown in FIGS. 2 and 3, a hole 20 is provided for mounting an optical monitoring device 9 in the position where part of the signal light as reflected from the beam splitter 4 crosses a side of the housing.

Embodiment 2

Figure 4:
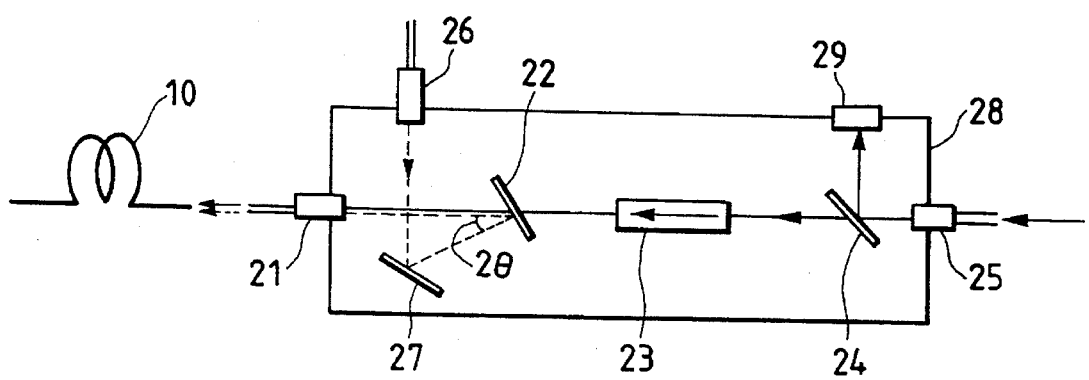
FIG. 4 is a schematic diagram showing the configuration of an embodiment of the optical multiplexing module of the invention.

FIG. 4 is a schematic diagram showing the configuration of the second embodiment of the optical multiplexing module of the present invention. The module, which is to be placed behind a rare-earth element doped optical fiber 10, supplies both signal light and pumping light into the fiber.

A first collimator 21 and a second collimator 25 are provided normal to opposing sides of a square or rectangular housing 28, whereas a third collimator 26 is provided normal to a side of the housing at right angles to the opposing sides.

A beam splitter 24 is provided on the optical axis of signal light not yet amplified which is to be admitted into the housing 28 from the second collimator. An optical isolator 23 is provided on the optical axis of the light passing through the beam splitter. A multiplexer 22 is provided on the optical axis of the light passing through the optical isolator. The first collimator 21 is provided on the optical axis of the light passing through the multiplexer 22.

A reflector mirror 27 is provided on the optical axis of the light to be admitted into the housing 28 from the third collimator 26. The multiplexer 22 is provided on the optical axis of the light to be reflected from the reflector mirror. The first collimator 21 is provided on the optical axis of the light to be reflected from the multiplexer.

In accordance with the invention, the multiplexer 22 is so positioned that the angle 8 at which the pumping light coming from the third collimator 26 is admitted into the multiplexer is no more than 22.5 degrees.

In addition, a monitoring light-receiving device 29 is provided in the position where part of the signal light as reflected from the beam splitter 24 and crosses a side of the housing thus enabling monitoring of the signal light level.

Figure 5:
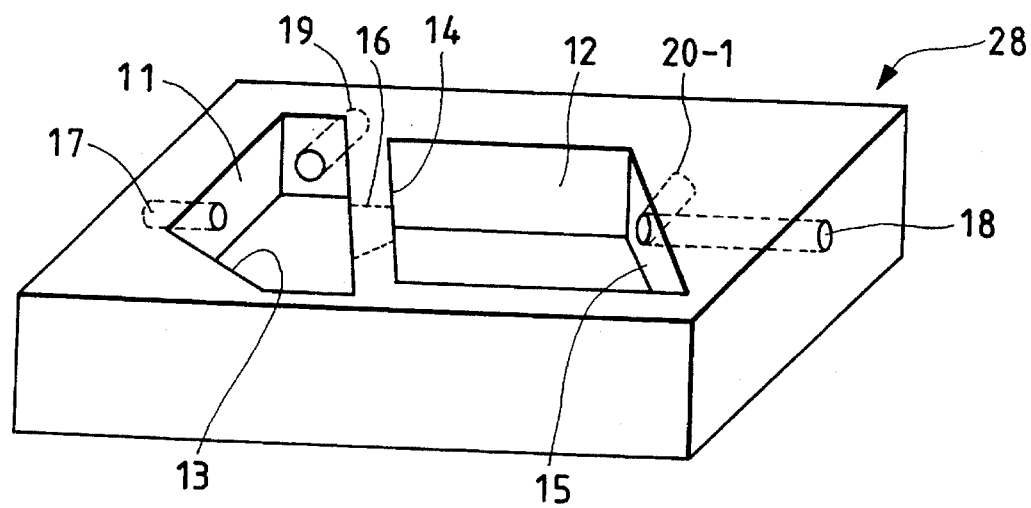
FIG. 5 is a perspective view of the housing for the optical multiplexing module shown in FIG. 4.

FIG. 5 is a perspective view of the housing for the optical multiplexing module shown in FIG. 4. The housing 28 is made of a single member in a square or rectangular form. A first hollow portion 11 and a second hollow portion 12 are formed from the top to the bottom surface of the central area of the housing. The first hollow portion 11 has a first inner surface 13 formed for fixing the reflector mirror 27 as it is inclined at a predetermined angle. The second hollow portion 12 has a second inner surface 14 and a third inner surface 15 provided for mounting the multiplexer 22 and the beam splitter 24, respectively, as they are inclined at predetermined angles, as well as a space into which the optical isolator 23 is to be inserted and fixed. A fourth hole 16 is provided between the first hollow portion 11 and the second hollow portion 12 for passing both the signal light and the pumping light.

A first hole 17 and a second hole 2 are provided in opposing sides of the housing for mounting the first collimator 21 and the second collimator 25, respectively, normal to the opposing sides, and a third hole 19 is provided in a side of the housing at right angles to the opposing sides for mounting the third collimator 26 normal to the side.

The second hole 18, the fourth hole 16 and the first hole 17 are provided in such a way that the signal light emitted from the second collimator 25 passes through the beam splitter 24, the optical isolator 23 and the multiplexer 22 to reach the first collimator 21 at a point in alignment with those three elements. With respect to the first inner surface 13 and the second inner surface 14, the angle 0 is adjusted so that the pumping light emerging from the third collimator 26 is admitted into the first collimator 21 by the reflector mirror 27 and the multiplexer 22 which are to be adhesively fixed on the first and second inner surfaces, respectively.

A fifth hole 20-1 is provided for mounting a monitoring light-receiving device 29 in the position where part of the split light as reflected from the beam splitter 24 crosses a side of the housing.

The housing 28 shown in FIG. 5 and the housing 8 shown in FIG. 2 have the same structure except that the fifth hole 20-1 is positioned on the opposite side to the hole 20. Therefore, both of these holes may sometimes be provided in a single housing.

Figure 6:
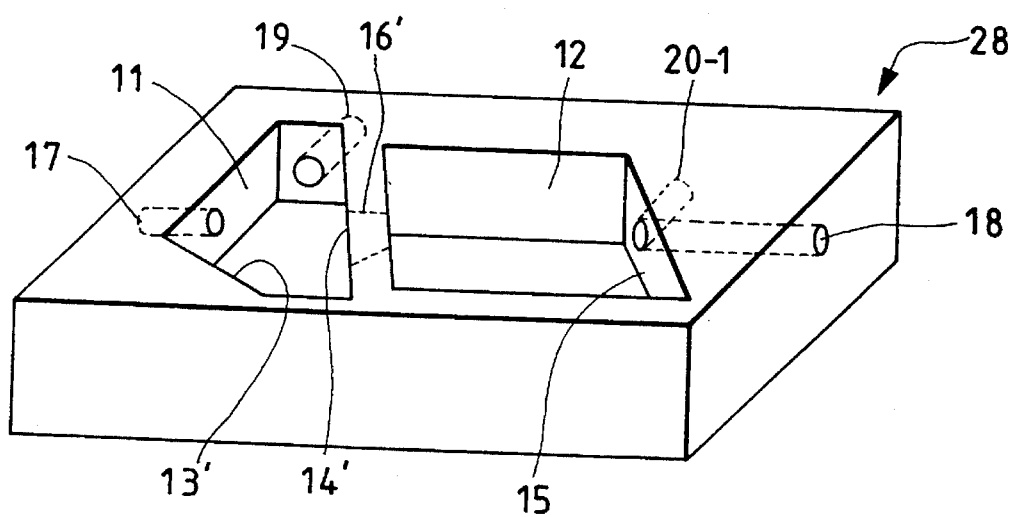
FIG. 6 is a perspective view showing another housing for the optical multiplexing module shown in FIG. 4.

Similarly, the housing 28 for an optical multiplexing module in FIG. 6 has the same structure as the housing 8 shown in FIG. 3, except that the fifth hole 20 is replaced by a fifth hole 20-1.

Embodiment 3

In accordance with the third embodiment of the present invention, the housing for accommodating an optical demultiplexing module has essentially the same structure as the housing for accommodating an optical multiplexing module. Therefore, the housing that is adapted for use irrespective of whether the module to be accommodated is for optical demultiplexing or multiplexing purposes will now be described. For the sake of simplicity, the following explanation is directed to the case of an optical demultiplexing module.

Figure 7A:
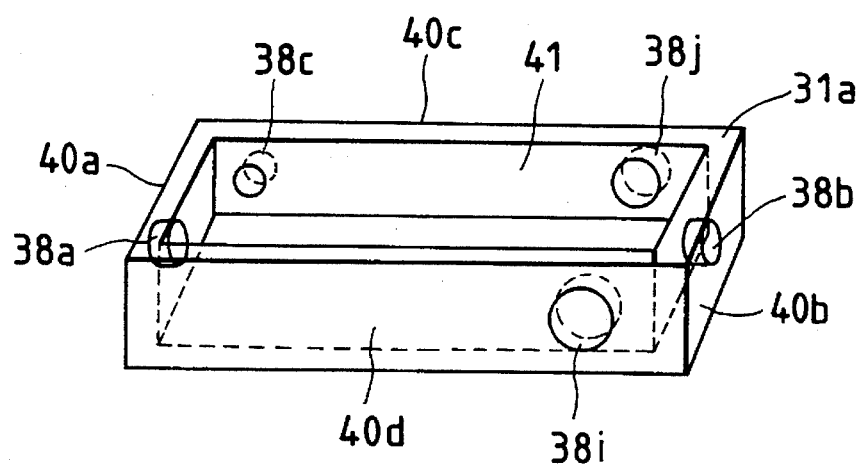
FIGS. 7a, 7b and 7c are a set of perspective views showing the three components of the housing for an optical demultiplexing/multiplexing module according to the invention.
Figure 7B:
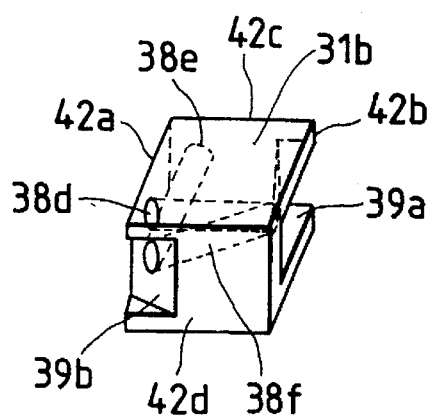
Figure 7C:
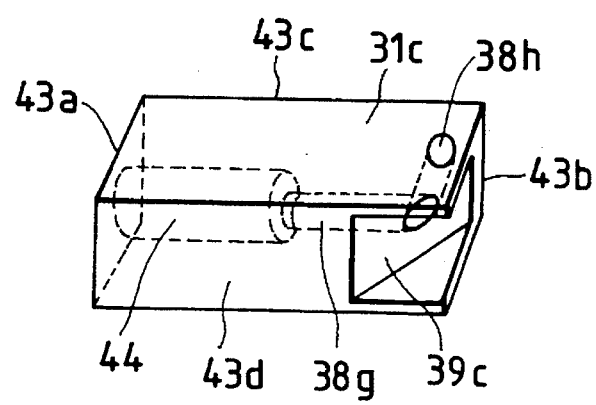

FIGS. 7a, 7b and 7c are perspective views showing the structures of the respective parts of the housing of Embodiment 3. As shown, the housing includes a block 31b for supporting the multiplexer 2 and the reflector mirror 7, a block 31c for supporting the optical isolator 3 and the beam splitter 4, and a frame 31a having in the central area a hollow portion 41 into which the blocks 31b and 31c are to be inserted and fixed. The frame 31a and blocks 31b and 31c are each made of a metal such as SUS or a hard plastic material and are either cut or extrusion molded to form an integral member that has a rugged and stable structure.

As shown in FIG. 7a, the frame 31a has the hollow portion 41 formed from the top to the bottom surface in the central area. The blocks 31b and 31c are to be inserted and fixed in the hollow portion 41. Holes 38a, 38b and 38c are made in sides 40a, 40b and 40c of the frame for fixing the first collimator 1, the second collimator 5 and the third collimator 6, respectively. Holes 38j and 38i are made in sides 40c and 40d of the frame so that monitoring light-receiving devices 29 and 9 can be inserted and fixed on those sides normal thereto. Accordingly, since these holes 38j and 38i are provided, the frame is applicable not only to the optical demultiplexing module but also to the optical multiplexing module. Therefore, either one of these holes may be omitted if the other suffices.

As shown in FIG. 7b, the block 31b is cut obliquely to the side 42b or 42c and to the side 42d or 42a to form recesses 39a and 39b in which the multiplexer 2 and the reflector mirror 7 can be adhesively fixed. Alternatively, a cylindrical hole may be bored obliquely through the respective sides to form the same recesses 39a and 39b. The inclination at which the sides of the block 31b are cut or provided with cylindrical holes obliquely is adjusted in such a way that the pumping light emitting from the third collimator 6 is reflected by the reflector mirror 7 and the multiplexer 2 to be admitted into the first collimator 1.

A hole 38f is provided between the recesses 39a and 39b so that the pumping light as reflected from the reflector mirror 7 reaches the multiplexer 2. In addition, a hole 38d is provided between the side 42a and the recess 39a for passing both the signal light and the pumping light so that they are admitted or allowed to emit from the first collimator 1 or the third collimator 6. A hole 38e is provided between the side 42c and the recess 39b for passing the pumping light so that it is admitted or allowed to emit from the first collimator or the third collimator.

As shown in FIG. 7c, the block 31c is cut obliquely to the side 43b or 43d to form a recess 39c in which the beam splitter 4 can be adhesively fixed. Alternatively, a cylindrical hole may be bored obliquely through the respective side to form the same recess 39c. A hole 44 is provided in the side 43a for passing the signal light from the optical isolator 3 toward the beam splitter 4. Also, the hole 44 passes the signal light not yet amplified which is to be admitted into the optical isolator from the second collimator 25. A hole 38g is provided connecting the bottom of the hole 44 to the recess 39c. Further provided is a hole 38h for insuring that part of the signal light passing through the optical isolator 3 is reflected by the beam splitter 4 to reach the monitoring light-receiving device 29. The hole 38h also passes part of the signal light passing through the second collimator as reflected from the beam splitter 24.

Figure 8:
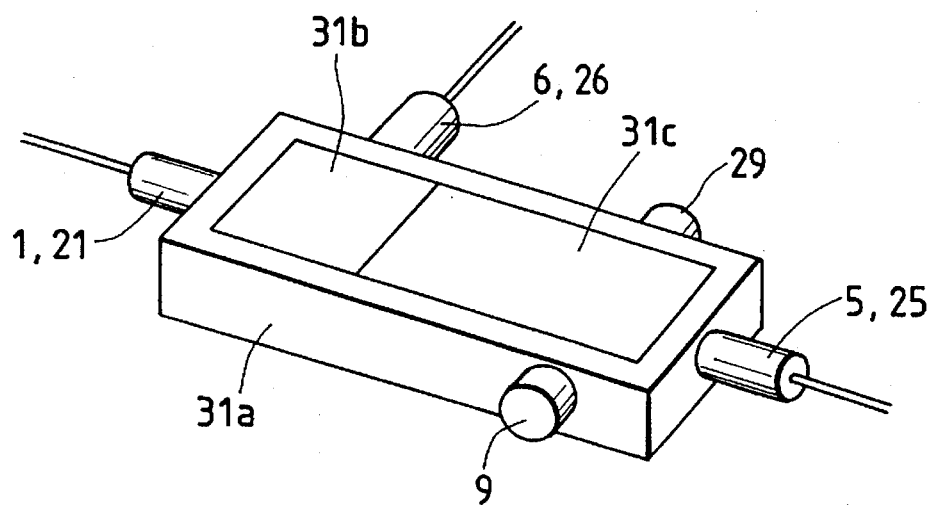
Figure 9:
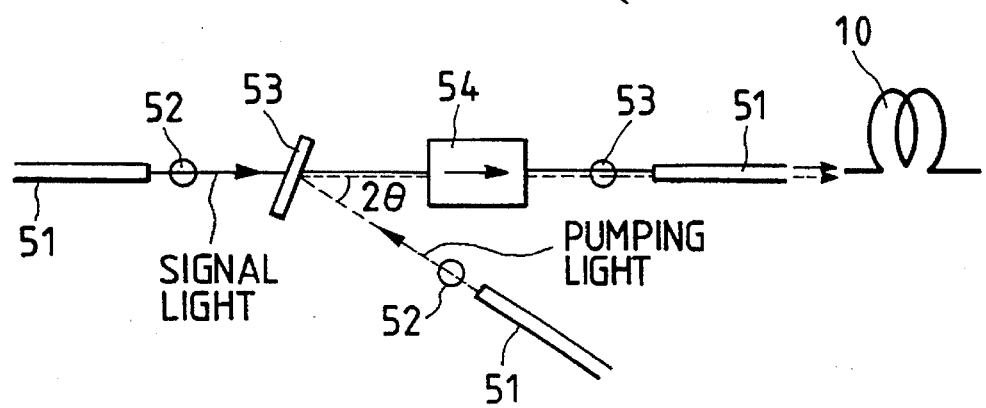
FIG. 9 is a layout of a conventional optical multiplexing module.

FIG. 8 is a perspective view showing the combination of frame 31a, block 31b and block 31c after the necessary optical devices are installed and adjusted in relative positions, followed by fixing the blocks in the frame to form an integral assembly by YAG laser welding or some other suitable method.

It should be mentioned here that holes 38d, 38e, 38f, 38g and 38h are provided simply for the purpose of passing the signal light and, hence, may be replaced by generally U-shaped grooves.

As described above, both the optical demultiplexing and multiplying modules of the present invention are so adapted that pumping light is admitted into the multiplexer at incident angles of no more than 22.5 degrees and, hence, their dependency on polarization and wavelength can be held at consistently low levels.

Further, signal light is not reflected within the housing but travels straight to be launched into or pass through the amplifying fiber, hence experiences small insertion loss.

In the housing of the present invention, each of the collimators is mounted normal to the associated side of the housing and, hence, optical devices can be assembled and adjusted in the housing by simple procedures.

The invention also provides a housing for an optical demultiplexing/multiplexing module having one frame and two blocks. Individual devices are assembled and adjusted in each separate block and the blocks thus accommodating the necessary devices are combined together within the frame to complete the dual module. Hence, small optical devices can be easily assembled and adjusted within a limited space.

What is claimed is:

1. An optical demultiplexing module for admitting pumping light into a rare-earth element doped fiber and for passing signal light that is amplified by the rare-earth element doped fiber, comprising:
   a square or rectangular housing body;
   a first collimator and a second collimator provided normal to opposing sides of said housing body, respectively;
   a third collimator provided normal to a side of said housing body at right angles to said opposing sides;
   a multiplexer provided on an optical axis if signal light which is admitted into said housing body from said first collimator;
   an optical isolator provided on the optical axis of the light passing through said multiplexer; and
   a beam splitter being provided at an output end of the optical isolator, wherein said multiplexer, said optical isolator and said beam splitter are provided in linear alignment;
   a reflector mirror provided on an optical axis of the pumping light to be admitted into said housing body from said third collimator;
   wherein said second collimator is provided on the optical axis of the signal pumping light passing through said beam splitter, said multiplexer is provided on the optical axis of the pumping light to be reflected from said reflector mirror, and said first collimator is disposed on the optical axis of the signal light to be reflected from the multiplexer, and said pumping light is admitted into said multiplexer at an angle no more than 22.5 degrees.

2. An optical demultiplexing module according to claim 1, further comprising a monitoring light-receiving device which is provided in a position where part of the signal light as reflected from the beam splitter crosses a side of said housing body.

3. A housing for an optical demultiplexing module for admitting pumping light into a rare-earth element doped fiber and for passing signal light that is amplified in the rare-earth element doped fiber, comprising:
   a housing body made of a single member in a square or rectangular form,
   a first hollow portion and a second hollow portion which are formed from a top to a bottom surface in a central area of said housing body, said first hollow portion having a first inner surface formed for mounting a reflector mirror as it is inclined at a predetermined angle, said second hollow portion having a space into which an optical isolator is to be inserted and fixed and a second inner surface and a third inner surface provided for mounting a multiplexer and a beam splitter, respectively, as they are inclined at predetermined angles;
   said housing body including means defining a fourth hole between said first hollow portion and said second hollow portion for passing both signal light and pumping light;
   said housing body further including means defining a first hole and a second hole in which a first collimator and a second collimator are mounted, respectively, said first and second holes being formed normal to opposing sides of said housing body;
   said housing body further including means defining a third hole provided in a side of said housing body at right angles to said opposing sides in which a third collimator is mounted normal to said side;
   wherein said first hole, said fourth hole and said second hole are provided so that signal light emitted from the first collimator passes linearly through the multiplexer, the optical isolator and the beam splitter to reach the second collimator, and said first inner surface and said second inner surface readjusted in an angle of incidence so that pumping light emitted from the third collimator is admitted into the first collimator by the reflector mirror and the multiplexer which are to be mounted on said first and second inner surfaces, respectively.

4. A housing for an optical demultiplexing module according to claim 3, wherein said housing body further comprises means defining a fifth hole which is provided for mounting a monitoring light-receiving device in the position where part of signal light reflected from the beam splitter crosses a side of the housing.

5. A housing for an optical demultiplexing module according to claim 4, wherein said first hole, second hole, third hole and said fifth hole are provided in respective sides of said housing body.

6. A housing for an optical demultiplexing module according to claim 3, wherein said first hole, second hole and third hole are provided in three respective sides of said housing body.

7. A housing for an optical demultiplexing module for admitting pumping light into a rear-earth element doped fiber and for passing signal light that is amplified in the rare-earth element doped fiber, comprising:

a housing body made of a single member in a square or rectangular form, a first hollow portion and a second hollow portion which are formed from the top to the bottom surface in a central area of said housing body, said first hollow portion having a first inner surface and a second inner surface formed for mounting a reflector mirror and a multiplexer, respectively, as they are inclined at a predetermined angle, said second hollow portion having a space into which an optical isolator is to be inserted and fixed and a third inner surface provided for mounting a beam splitter, respectively, as it is inclined at predetermined angles;

said housing body including means defining a fourth hole between said first hollow portion and said second hollow portion for passing both the signal light and the pumping light;

said housing body further including means defining a first hole and a second hole for mounting a first collimator and a second collimator, respectively, said first and second collimators being mounted normal to opposing sides of said housing body;

said housing body further including means defining a third hole in a side of said housing body at right angles to said opposing sides for mounting a third collimator normal to said side;

wherein said first hole, said fourth hole and said second hole are provided so that the signal light emitted from the first collimator passes linearly through the multiplexer, the optical isolator and the beam splitter to reach the second collimator, and said first inner surface and said second inner surface are adjusted in angle of incidence so that the pumping light emitted from the third collimator is admitted into the first collimator by the reflector mirror and the multiplexer which are to be mounted on said first and second inner surfaces, respectively.

8. A housing for an optical demultiplexing module according to claim 7, wherein said housing body further comprises means defining a fifth hole for mounting a monitoring light-receiving device in a position where part of signal light, as reflected from the beam splitter, crosses a side of the housing.

9. A housing for an optical demultiplexing module according to claim 8, wherein said first hole, second hole, third hole and said fifth hole are provided in respective sides of said housing body.

10. A housing for an optical demultiplexing module according to claim 7, wherein said first hole, second hole and third hole are provided in three respective sides of said housing body.

11. An optical multiplexing module for admitting both pumping light and signal light into a rare-earth element doped fiber, comprising:

a square or rectangular housing body;

a first collimator and a second collimator provided normal to opposing sides of said housing body, respectively;

a third collimator provided normal to a side of said housing body at right angles to said opposing sides;

a beam splitter provided on an optical axis of signal light which is admitted into said housing body from said second collimator;

an optical isolator provided on the optical axis of the light passing through said beam splitter;

a multiplexer being provided at an output end of the optical isolator, said multiplexer, said optical isolator and said beam splitter being provided in linear alignment; and a reflector mirror provided on the optical axis of the pumping light to be admitted into aid housing body from said third collimator;

wherein said first collimator is provided on the optical axis of the light passing through said multiplexer, said multiplexer is provided on the optical axis of pumping the light to be reflected from said reflector mirror, and said first collimator is provided on the optical axis of pumping the light to be reflected from the multiplexer, and wherein said pumping light is admitted into said multiplexer at an angle of no more than 22.5 degrees.

12. An optical multiplexing module according to claim 11, further comprising a monitoring light-receiving device which is provided in a position where part of the signal light as reflected from the beam splitter crosses a side of said housing body.

13. A housing for an optical multiplexing module for admitting both pumping light and signal light into a rare-earth element doped fiber, comprising:

a housing body made of a single member in a square or rectangular shape, a first hollow portion and a second hollow portion formed from a top to a bottom surface in a central area of said housing body, said first hollow portion having a first inner surface formed for mounting a reflector mirror as it is inclined at a predetermined angle, said second hollow portion having a space into which an optical isolator is to be inserted and fixed and a second inner surface and a third inner surface provided for mounting a multiplexer and a beam splitter, respectively, inclined at predetermined angles;

said housing body including means defining a fourth hole provided between said first hollow portion and said second hollow portion for passing both the signal light and the pumping light;

said housing body further including means defining a first hole and a second hole for respectively mounting a first collimator and a second collimator normal to opposing sides of said housing body;

said housing body further including means defining a third hole provided in a side of said housing body at right angles to said opposing sides for mounting therein a third collimator normal to said side;

wherein said second hole, said fourth hole and said first hole are provided so that the signal light emitted from the second collimator passes linearly through the beam splitter, the optical isolator and the multiplexer to reach the first collimator, and said first inner surface and said second inner surface are adjusted in the angle of incidence so that the pumping light emitted from the third collimator is admitted into the first collimator by the reflector mirror and the multiplexer which are to be mounted on said first and second inner surfaces, respectively.

14. A housing for an optical multiplexing module according to claim 13, wherein said housing body further comprises means defining a fifth hole provided for mounting a monitoring light-receiving device in a position where part of the signal light, as reflected from the beam splitter, crosses a side of the housing.

15. A housing for an optical multiplexing module for admitting both pumping light and signal light into a rare-earth element doped fiber, comprising:

a housing body made of a single member in a square or rectangular form, a first hollow portion and a second hollow portion formed from a top to a bottom surface in a central area of said housing body, aid first hollow portion having a first inner surface and a second inner surface formed for mounting a reflector mirror and a multiplexer, respectively, which are inclined at predetermined angles, said second hollow portion having a space into which an optical isolator is to be inserted and fixed and a third inner surface provided for mounting a beam splitter, respectively, which is inclined at a predetermined angle;

said housing body including means defining a fourth hole provided between said first hollow portion and said second hollow portion for passing both the signal light and the pumping light;

said housing further including means defining a first hole and a second hole for respectively mounting a first collimator and a second collimator normal to opposing sidles of said housing body;

said housing further including means defining a third hole provided in a side of said housing body at right angles to said opposing sides for mounting a third collimator normal to said side;

wherein said second hole, said fourth hole and said first hole are provided so that the signal light emitted from the second collimator passes linearly through the beam splitter, the optical isolator and the multiplexer to reach the first collimator, and said first inner surface and said second inner surface are adjusted in the angle of incidence so that the pumping light emitting from the third collimator is admitted into the first collimator by the reflector mirror and the multiplexer which are to be mounted on said first and second inner surfaces, respectively.

16. A housing for an optical multiplexing module according to claim 15, said housing body further comprises a fifth hole mounting a monitoring light-receiving device in a position where part of the signal light as reflected from the beam splitter crosses a side of the housing.

17. A housing for an optical demultiplexing/multiplexing module for admitting pumping light into a rare-earth element doped fiber and for allowing signal light to emit after amplification by the rare-earth element doped fiber, comprising:

a first block for supporting a multiplexer and a reflector mirror;

a second block for supporting an optical isolator and a beam splitter; and a frame defined by a pair of opposing first and second sides and another pair of opposing third and fourth sides in a square or rectangular form, said frame having in a central area a hollow portion into which said first and second blocks are to be inserted and fixed, and said frame including means defining a first hole, a second hole and a third hole for fixing a first collimator, second collimator and a third collimator, respectively, wherein said first hole, said second hole and said third hole are provided in said first side, said second side and said third side, respectively.

18. A housing for an optical demultiplexing/multiplexing module according to claim 17, wherein said first block is defined by a pair of opposing fifth and sixth sides and another pair of seventh and eighth opposing sides in a square or rectangular form, said first block comprising;

a first recess, which is provided in at least one of said sixth side and said seventh side, for fixing the multiplexer;

a second recess, which is provided in at least one of said first side and said eighth side, for fixing the reflector mirror;

said first block further including means defining a fourth hole between said first and second recesses so that the pumping light as reflected from the reflector mirror reaches the multiplexer;

said first block further including means defining a fifth hole between said fifth side and said first recess for passing both the signal light and the pumping light so that they are admitted or allowed to emit from one of the first collimator and the third collimator; and said first block further including means defining a sixth hole between said seventh side and said second recess for passing the pumping light so that it is admitted or allowed to emit from one of the first collimator and the third collimator.

19. A housing for an optical demultiplexing/multiplexing module according to claim 17, wherein said second block is defined by a pair of opposing ninth and tenth sides and another pair of opposing eleventh and twelfth sides in a square or rectangular form, said second block comprising:

a third recess formed in at least one of said tenth side and the twelfth side for fixing the beam splitter;

said second block further including means defining a seventh hole in said ninth side toward said tenth side for fixing the optical isolator;

said second block further including means defining an eighth hole connecting the bottom of said seventh hole to said third recess for passing at least one of the signal light from the optical isolator to the beam splitter and the signal light from the beam splitter to the optical isolator; and said second block further including means defining a ninth hole for insuring that at least one of part of the signal light that passes through the optical isolator is reflected by the beam splitter and that part of the signal light coming from the second collimator reaches a monitoring light-receiving device.

20. A housing for an optical demultiplexing/multiplexing module according to claim 17, wherein said frame further comprises means defining at least one mounting hole for mounting a monitoring light-receiving device, which is provided in at least one of said third side and said fourth side.

21. A housing for an optical demultiplexing/multiplexing module according to claim 20, wherein said mounting hole is in at least one of one position where part of the signal light, as reflected from the beam splitter crosses said fourth side of said frame and an other position where part of the signal light coming from the second collimator crosses said third side of the frame after it is reflected by the beam splitter.

\* \* \* \* \*